United States Patent
Mashuryan et al.

(10) Patent No.: US 12,155,506 B1
(45) Date of Patent: Nov. 26, 2024

(54) CLOUD-BASED CONTROL AND BRIDGE FOR CONNECTED INTERNET OF THINGS (IoT) DEVICES

(71) Applicant: Heltun, Inc., Los Altos Hills, CA (US)

(72) Inventors: Ashot Mashuryan, Yerevan (AM); Giorgi Gulabyan, San Francisco, CA (US)

(73) Assignee: Heltun, Inc., Los Altos Hills, CA (US)

( * ) Notice: Subject to any disclaimer, the term of this patent is extended or adjusted under 35 U.S.C. 154(b) by 0 days.

(21) Appl. No.: 17/302,888

(22) Filed: May 14, 2021

Related U.S. Application Data

(60) Provisional application No. 63/026,074, filed on May 17, 2020.

(51) Int. Cl.
| | |
|---|---|
| H04L 41/0806 | (2022.01) |
| G16Y 30/00 | (2020.01) |
| H04L 12/46 | (2006.01) |
| H04L 69/08 | (2022.01) |
| H04W 88/16 | (2009.01) |

(52) U.S. Cl.
CPC ............ H04L 12/46 (2013.01); G16Y 30/00 (2020.01); H04L 69/08 (2013.01); H04W 88/16 (2013.01)

(58) Field of Classification Search
CPC .......... G06N 3/08; G06N 20/00; G06N 5/025; H04L 67/562; H04L 69/08; H04W 84/12
See application file for complete search history.

(56) References Cited

U.S. PATENT DOCUMENTS

| | | | |
|---|---|---|---|
| 5,894,471 A | 4/1999 | Miyagi et al. | |
| 9,774,604 B2 | 9/2017 | Zou et al. | |
| 10,291,714 B2 | 5/2019 | Mathews et al. | |
| 10,362,037 B2 | 7/2019 | Zou et al. | |
| 2007/0245412 A1* | 10/2007 | Signaoff | H04L 61/2514 713/150 |
| 2010/0106962 A1 | 4/2010 | Chen | |
| 2016/0182309 A1 | 6/2016 | Maturana et al. | |
| 2018/0082575 A1* | 3/2018 | El-Mankabady | H04L 67/12 |
| 2018/0139286 A1* | 5/2018 | Jia | H04L 67/125 |
| 2018/0234266 A1* | 8/2018 | Rudolph | H04L 67/12 |
| 2019/0081503 A1 | 3/2019 | Kim | |
| 2019/0206231 A1* | 7/2019 | Armstrong | G08B 25/10 |
| 2019/0239048 A1 | 8/2019 | Nuttall et al. | |
| 2020/0275278 A1* | 8/2020 | Hanawa | G06N 20/20 |
| 2021/0314183 A1 | 10/2021 | Ward et al. | |
| 2021/0314407 A1* | 10/2021 | Ng | H04L 67/562 |
| 2022/0171392 A1* | 6/2022 | Park | G06Q 50/10 |

OTHER PUBLICATIONS

Non-Final Office Action in U.S. Appl. No. 17/302,892 mailed on Jul. 24, 2023.

\* cited by examiner

*Primary Examiner* — Mansour Oveissi
(74) *Attorney, Agent, or Firm* — Arluys IP, P.C.

(57) ABSTRACT

Systems and methods using a universal bridge acting as a gateway to a cloud-based control system to control Internet of Things (IoT) devices are disclosed. The system comprises a cloud-based server, and a bridge operable in a plurality of communication protocols and coupled to the IoT devices. Each IoT device communicates with the bridge using at least one of the plurality of communication protocols. The bridge transmits data received from the IoT devices to the cloud-based server over a network, and receives data from the cloud-based server, over the network, to be transmitted to at least one IoT device from the plurality of IoT devices.

18 Claims, 6 Drawing Sheets

CLOUD-BASED CONTROL AND BRIDGE FOR CONNECTED INTERNET OF THINGS (IoT) DEVICES

CROSS REFERENCE TO RELATED APPLICATIONS

This application claims the benefit of U.S. Provisional Application No. 63/026,074 filed on May 17, 2020, the disclosure of which is incorporated herein by reference.

TECHNICAL FIELD

Embodiments of the disclosure relate to control of Internet of Things (IoT) devices, and more specifically, relate to cloud-based control of connected IoT devices using a universal bridge.

BACKGROUND

FIG. 1 is a block diagram illustrating a conventional IoT system. In FIG. 1, devices 110-01, 110-02, . . . , 110-0$n$ are connected to a controller 120, such as a mobile device (e.g., smartphone, tablet-computer, etc.). Devices 110-01, 110-02, . . . , 110-0$n$ (collectively referred to as devices 110) are Internet of Things (IoT) devices and can be used in the fields such as real-time analytics, machine learning, sensors, actuators, control systems, manufacturing, vehicular communication systems, automation (home and building automation), etc. IoT refers to a system of interrelated computing devices, mechanical and digital machines that are provided with unique identifiers (UIDs) and the ability to transfer data over a network without requiring human-to-human or human-to-computer interaction. Examples of devices 110-01, 110-02, . . . , 110-0$n$ include lighting fixtures, thermostats, home security, appliances, etc., and can be controlled by controller 120. Examples of controller 120 include smartphone, smart speaker, etc. Devices 110-01, 110-02, . . . , 110-0$n$ communicate to the controller 120 using protocols 130-01 . . . 130-0$n$, respectively. Examples of the protocols 130-01 . . . 130-0$n$ used for communication include Bluetooth, LoRa, ZigBee, Z-Wave, Wi-Fi, etc. Controller 120 may or may not have the ability to communicate directly to devices 110-01 . . . 110-0$n$ because it does not support the protocols 130-01 . . . 130-0$n$ and would require additional protocol controllers 131-01 . . . 131-On (collectively referred to as protocol controllers 131). The additional protocol controllers 131 can add both capital and operational costs to the system. The additional protocol controllers 131 can also increase the power supply requirements. This can be a noticeably big constraint on the system when a large number of IoT devices 110 need to be connected or controlled. An example of a protocol controller 131 can be a LoRa to Bluetooth protocol converter. Devices 110-01, 110-02, . . . 110-0$n$ are controlled by software applications (or apps) 140-01, 140-02, . . . , 140-0$n$, respectively, on controller 120. Smart digital assistants/speakers, such as Siri, Alexa, Google, etc., in turn call the apps 140-01 . . . 140-0$n$.

FIG. 2 is a block diagram illustrating a conventional IoT system, where the devices are connected to the Internet. Like FIG. 1, FIG. 2 shows devices 110-01, 110-02, . . . 110-0$n$ connected to the controller 120, but in this case, devices 110-01 . . . 110-0$n$ are connected to the controller 120 via the Internet/network 160. In this example, devices 110-01, 110-02 are connected to the network 160 via Wi-Fi network (not shown) and Wi-Fi router 150. Device 110-0$n$ is connected directly to the network 160 via connection 135. Example of connection 135 can be a cellular connection (e.g., 3G, 4G, long term evolution (LTE), etc.), wired (Ethernet, etc.) or other types of connections (e.g., satellite). A drawback of an IoT device 110 being connected directly to the Internet is the additional cost and complexity. That is, the IoT device 110 would need to support software stacks, like TCP/IP, DNS, HTTP, etc., on top of the Wi-Fi or cellular protocol to enable communication. This increases the energy footprint of the device. As the devices are directly connected to Internet, security also becomes a huge issue for system designers to consider.

Unfortunately, devices 110-01, 110-02, . . . , 110-0$n$ are manufactured by different vendors and the respective apps 140 used to control them would be quite different from one another. Further modifications may also be required to the apps 140 in order to make them work with different smart digital assistants. Moreover, the different manufacturers along with the different apps make it very difficult for the various devices 110 to work together. The diverse apps 140 can prevent any synergy between devices other than sometimes being controllable by a smart digital assistant (or smart speaker). Therefore, there is a need of a solution that will allow the various devices 110 to work together and allow a user to a unified experience in controlling all connected devices in unison.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
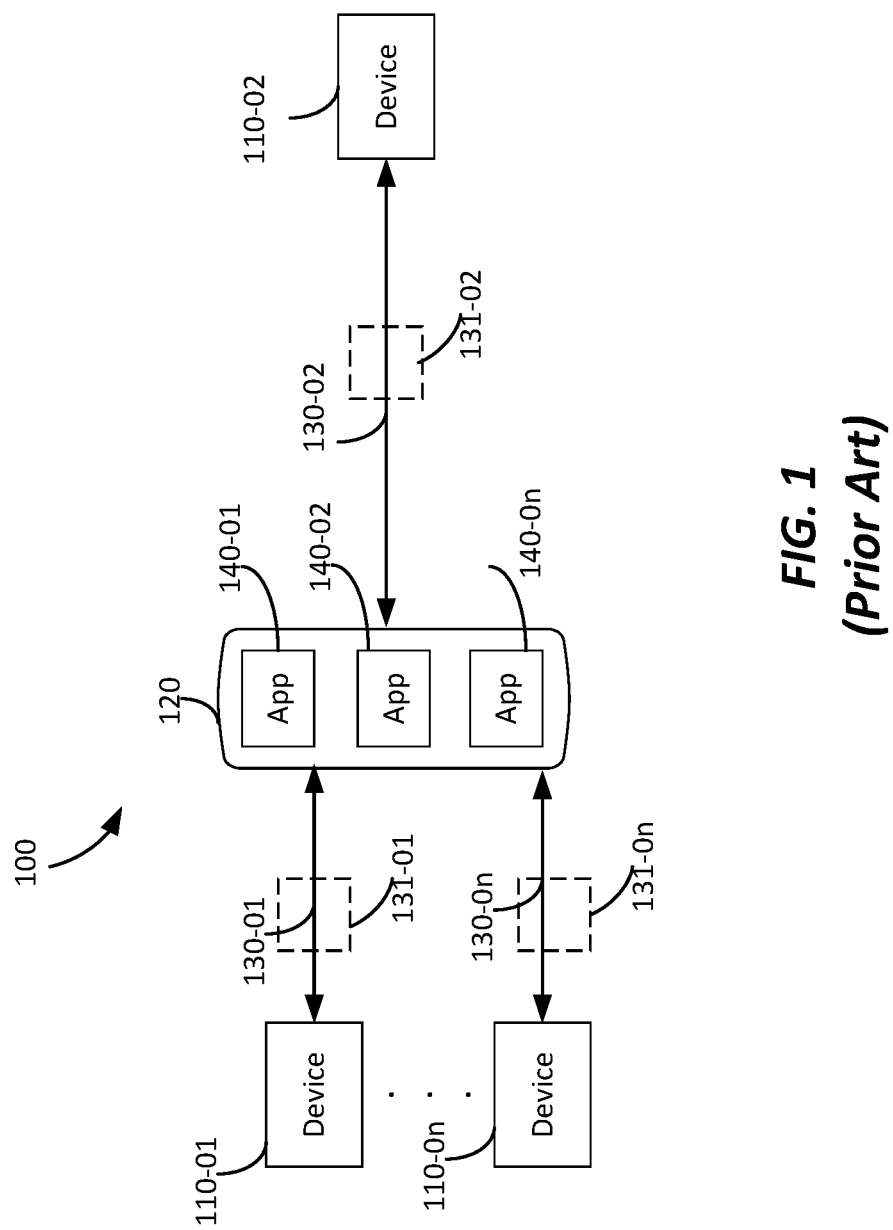
FIG. 1 is a block diagram illustrating a conventional IoT system.
Figure 2:
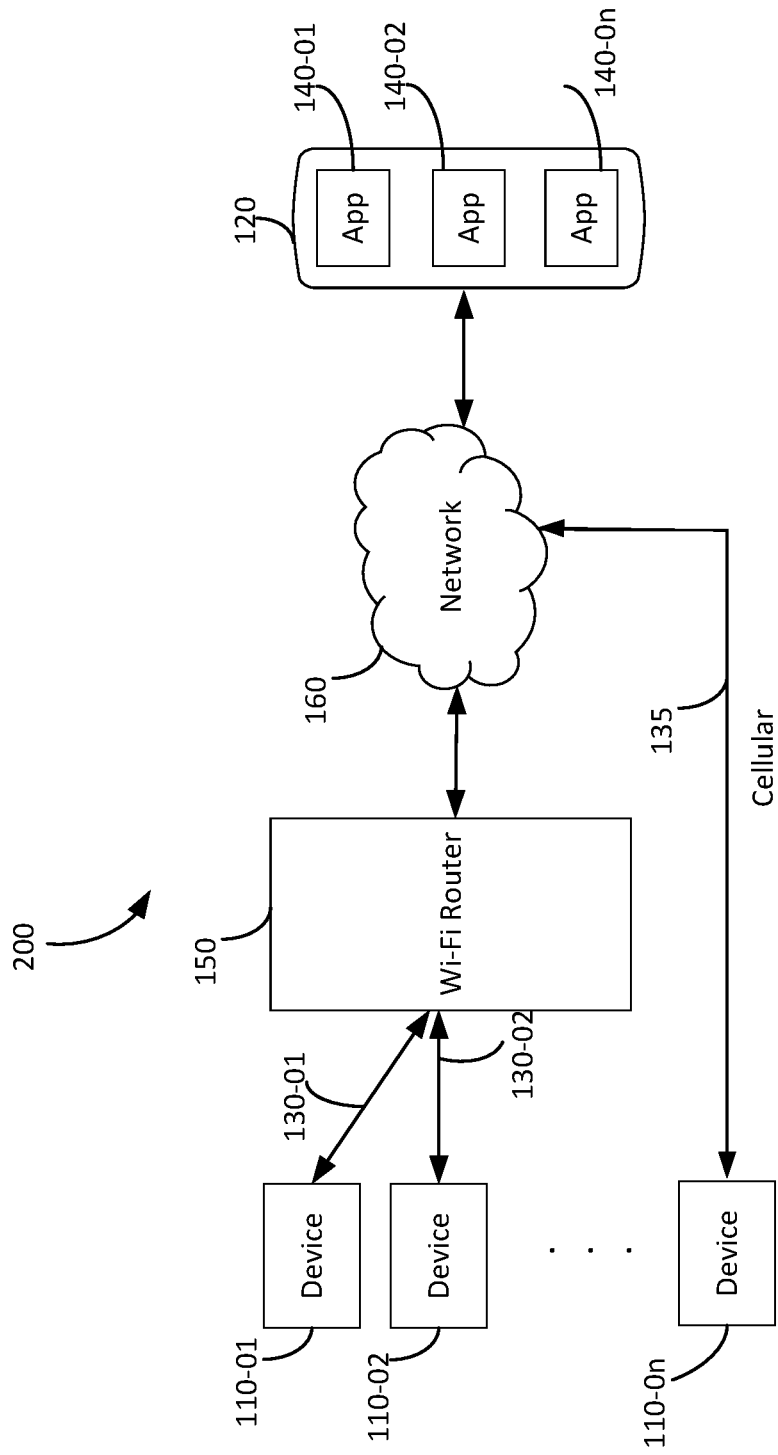
FIG. 2 is a block diagram illustrating a conventional IoT system, where devices are connected to the Internet.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

Systems and methods that use a universal bridge acting as a gateway to a cloud-based control system are disclosed. The universal bridge can connect many different devices (IoT—Internet of Things) that require plurality of control protocols. The universal bridge is connected to a cloud-based control system capable of handling the plurality of control protocols. The devices and the bridge are controlled using a cloud-based system and the universal bridge cannot be controlled locally.

According to one aspect, a cloud-based control system for controlling Internet of Things (IoT) devices is provided. The system comprises a cloud-based server, and a bridge operable in a plurality of communication protocols and coupled to the IoT devices. Each IoT device may communicate with the bridge using at least one of the plurality of communication protocols. The bridge may transmit data received from the IoT devices to the cloud-based server over a network, and receive data from the cloud-based server, over the network, to be transmitted to at least one IoT device from the plurality of IoT devices.

According to another aspect, a cloud-based control system for controlling IoT devices is provided. The system comprises a cloud-based server, and a plurality of bridges. Each bridge may be coupled to its respective group of IoT devices from the plurality of IoT devices, may be operable in a plurality of communication protocols, and may communicate with the respective group of IoT devices using at least one of the plurality of communication protocols. Furthermore, each bridge may transmit data received from the respective group of IoT devices to the cloud-based server over a network, and receive data from the cloud-based server, over the network, to be transmitted to at least one IoT device from the respective group of IoT devices.

According to yet another aspect, a computer-implemented method for cloud-based control of IoT devices coupled to a bridge is provided, where the bridge is operable in a plurality of communication protocols. The method comprises receiving data from the IoT devices, where each IoT device may communicate with the bridge using at least one of the plurality of communication protocols. The method further comprises aggregating the received data from the IoT devices. The method further comprises transmitting the aggregated data to a cloud-based server over a network. The method further comprises receiving data from the cloud-based server, over the network, to be transmitted to at least one IoT device from the plurality of IoT devices. The method further comprises segregating the received data from the cloud-based server for the at least one IoT device. The method further comprises transmitting the segregated data to the at least one IoT device using a communication protocol.

Figure 3A:
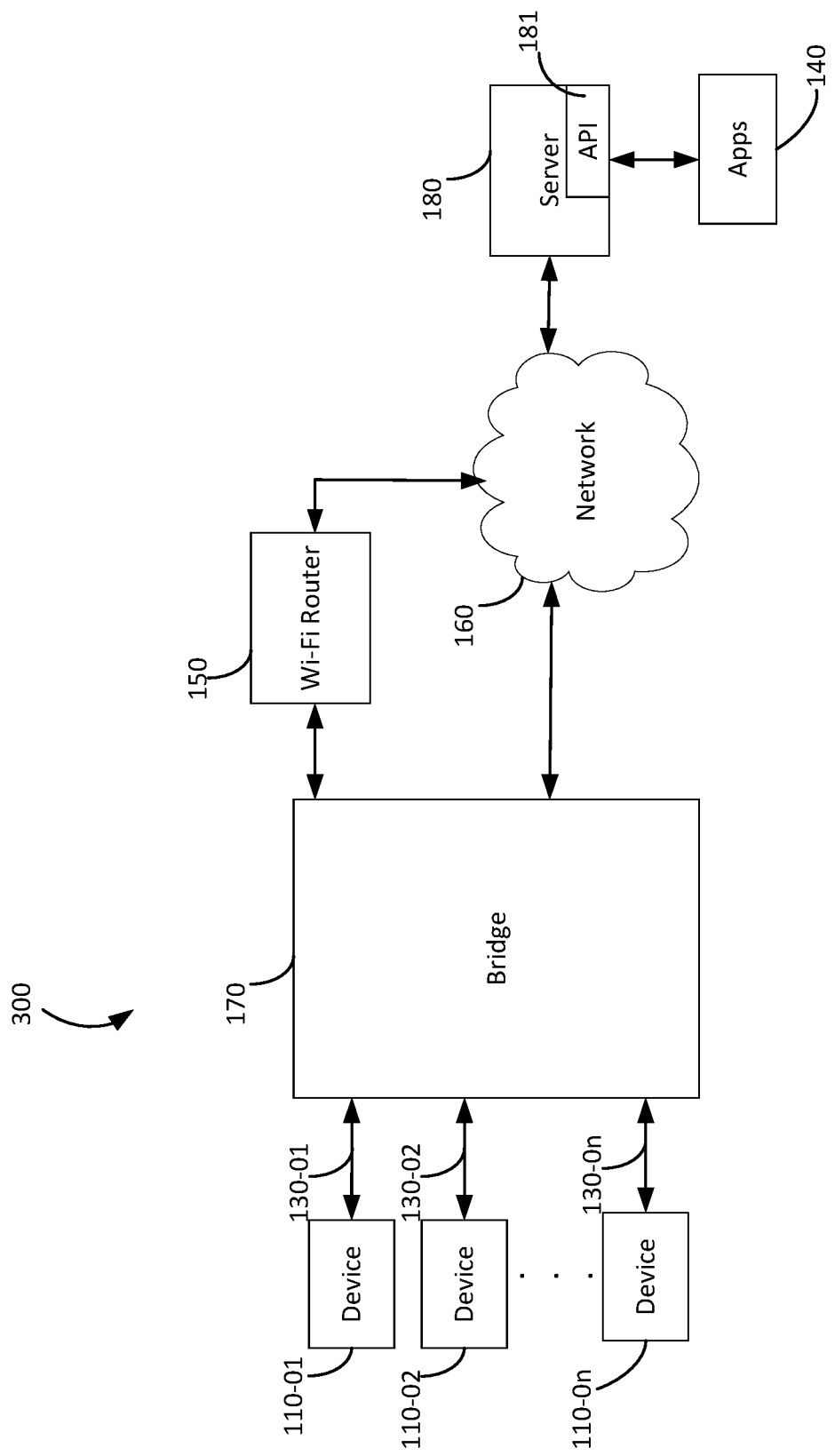
FIG. 3A is a block diagram illustrating an example of a system using a universal bridge according to an embodiment.

FIG. 3A is a block diagram illustrating an example of a system using a universal bridge according to an embodiment. Referring to FIG. 3A, system 300 may include devices 110-01, 110-02, . . . , 110-0n (e.g., IoT devices) connected or coupled to a universal bridge 170 using various communication protocols 130-01, 130-02, . . . , 130-0n (collectively referred to as communication protocols 130). Examples of protocols 130 can be Bluetooth, LoRa, ZigBee, Z-Wave, Wi-Fi, etc. Bridge 170 is communicatively coupled or connected to server 180 over network/Internet 160. Bridge 170 can connect or couple to the network 160 via Wi-Fi router 150. Bridge 170 can connect or couple to the server 180 using other types of connections, such as a wired connection (e.g. Ethernet, fiber, etc.) or a wireless connection (e.g., cellular 3G, 4G, LTE, 5G, satellite etc.). In an embodiment, bridge 170 can connect to server 180 using multiple connections to allow for redundancy. For example, bridge 170 can connect to server 180 using multiple wired interfaces, multiple wireless connections, or a combination of wired and wireless interfaces. Many different configurations are possible in terms of connectivity between server 180 and bridge 170 and are primarily driven by cost and system goals. Server 180 may include one or more APIs 181 that allow for control of devices 110 or bridge 170 by one or more software applications (or apps) 140. Apps 140 may be installed on a controller, such as controller 120 as previously described, and the controller may be communicatively coupled to server 180 directly or over a network (e.g., network 160). APIs 181 may be provided by various smart speakers/digital assistants to server 180 to enable integration with digital assistants, such as Siri, Alexa, Google, etc. (not explicitly shown in the figure) or other software.

Figure 3B:
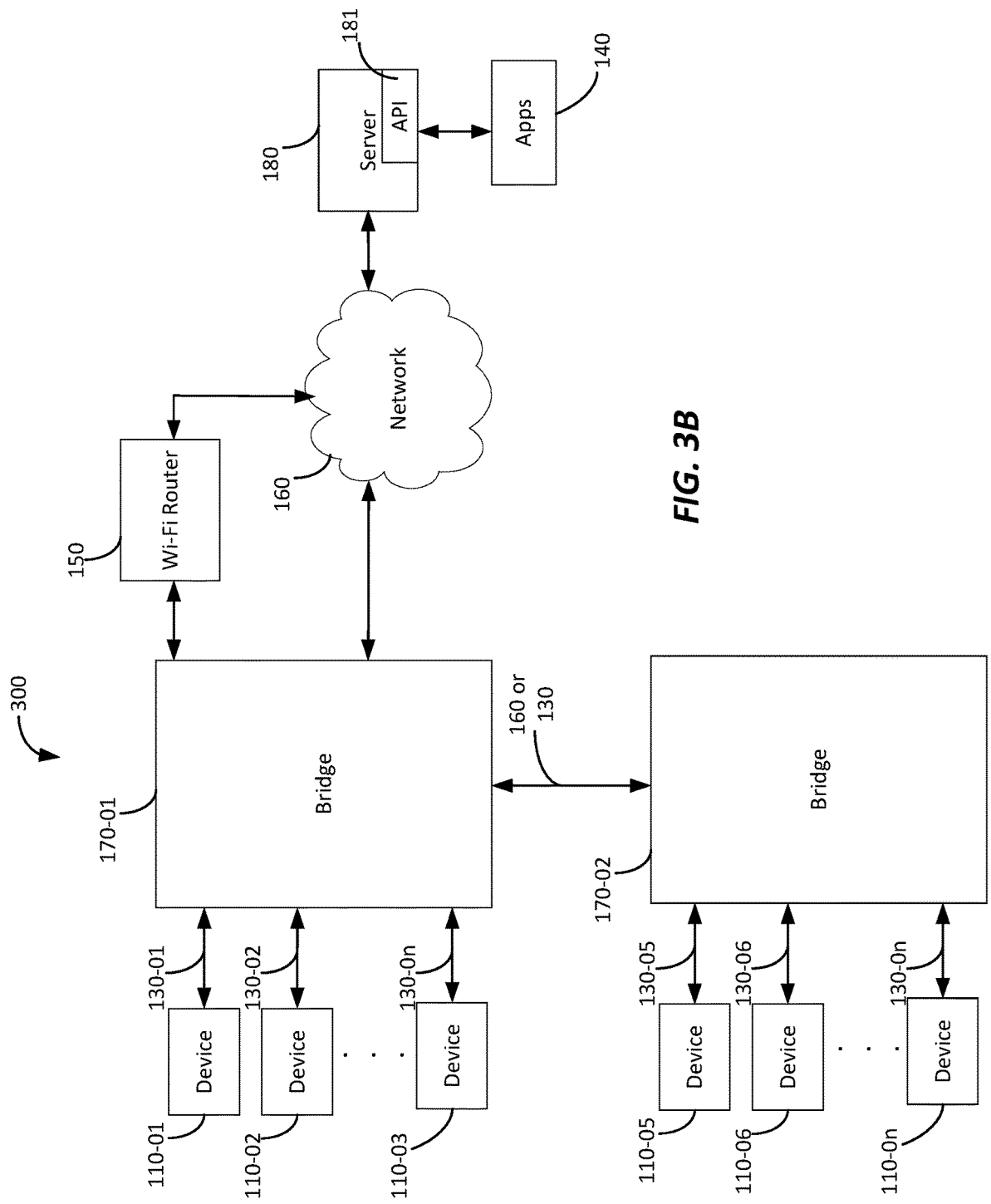
FIG. 3B is a block diagram illustrating an example of a system using multiple universal bridges according to an embodiment.

FIG. 3B is a block diagram illustrating an example of a system using multiple universal bridges according to an embodiment. In FIG. 3B, system 300 includes two bridges 170-01, 170-02, though system 300 can be expanded to use any number of universal bridges 170 and can be used to connect to any number of devices 110. In FIG. 3B, bridge 170-01 is connected or coupled to devices 110-01, 110-02, . . . , 110-03, and bridge 170-02 is connected or coupled to devices 110-05, 110-06, . . . , 110-0n. Universal bridges 170-01 and 170-02 may communicate with each other using protocol 130 (e.g., LoRa, Bluetooth, etc.) or over network 160. For example, bridge 170-01 may receive data from bridge 170-02 (e.g., data associated with devices 110-05, 110-06, . . . , 110-0n) using protocol 130, and send/forward the data to server 180 over network 160. Conversely, bridge 170-01 may receive data associated with bridge 170-02 (e.g., control instructions to control devices 110-05, 110-06, . . . , 110-0n) from server 180 over network 160, and send/forward the data to bridge 170-02 using protocol 130. In this example, bridge 170-02 can be seen as another device 110. In one embodiment, each universal bridge (e.g., bridge 170-01, bridge 170-02, and so on) can communicate independently with the server 180 over network 160. Many different configurations are possible in terms of connectivity between the bridges 170, and between the bridges 170 and server 180 and are primarily driven by cost and implementation goals. In one embodiment, multiple bridges 170 can be used to provide for geographical expansion, e.g., multiple floors or wings in a building/hotel, multiple streets within a neighborhood, sections with a factory/warehouse, etc. In another embodiment, multiple bridges 170 are used for connecting to additional devices 110. In yet another embodiment, multiple bridges 170 can be used for redundancy.

Figure 4:
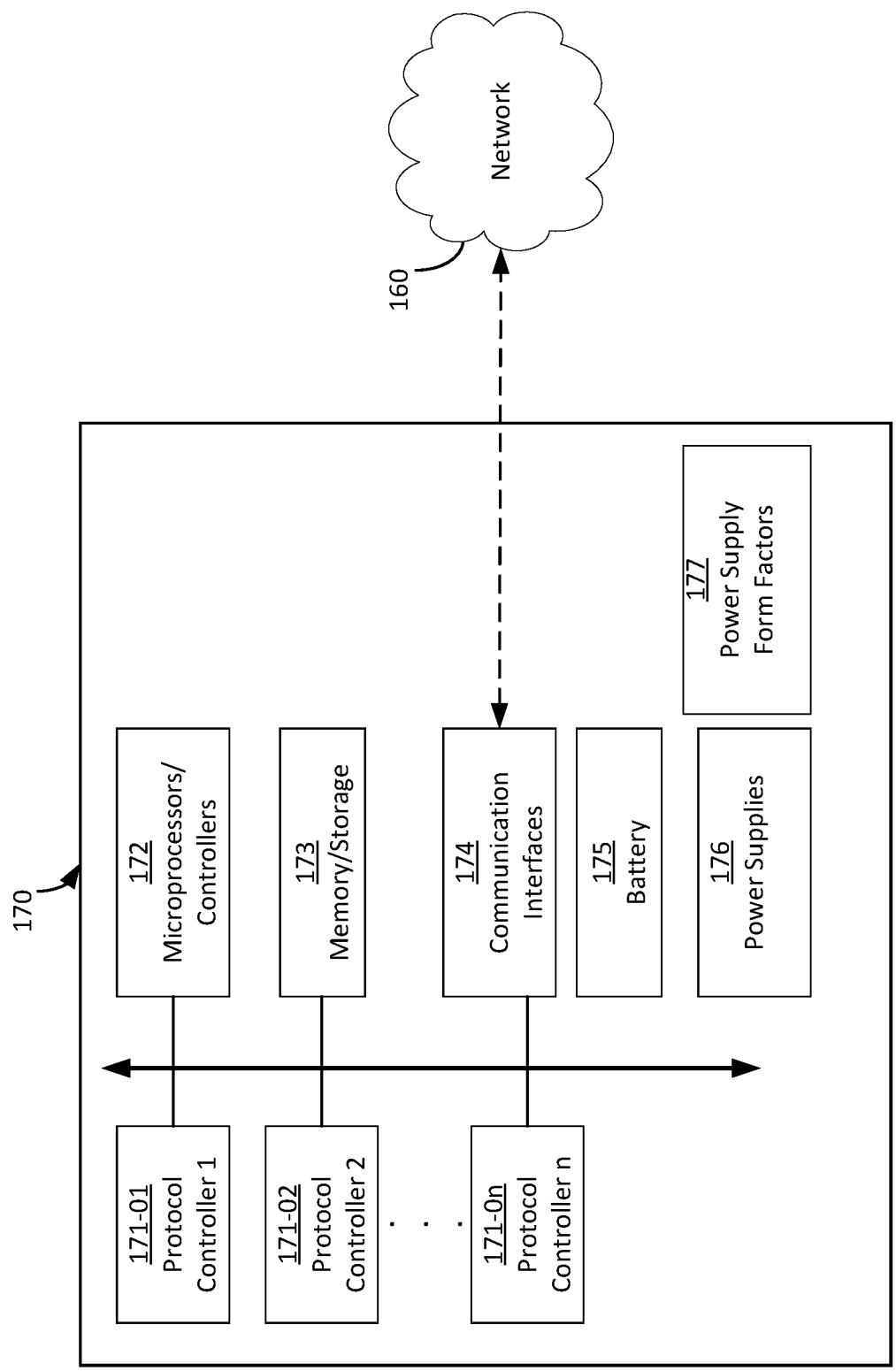
FIG. 4 is a block diagram illustrating an example of a bridge according to an embodiment.

FIG. 4 is a block diagram illustrating an example of a bridge according to an embodiment. As shown in FIG. 4, bridge 170 (shown previously in FIGS. 3A-3B) can include any number of protocol controllers 171-01, 171-02, . . . , 171-On. For example, protocol controller 171-01 can be used to implement or control a first communication protocol (e.g., Bluetooth), protocol controller 171-02 can be used to implement or control a second communication protocol (e.g., LoRa), and protocol controller 171-On can be used to implement or control multiple communication protocols (e.g., Zigbee, Z-Wave, Bluetooth, etc.). Based on the implementation or control of the protocols, a protocol controller 171 can be used to communicate with several connected devices 110, thereby allowing simultaneous control of multiple devices 110. Bridge 170 can include one or more microprocessors or controllers 172 to control the bridge 170. In an embodiment, the microprocessors 172 can also be used to control IoT devices 110 (via protocol controller 171).

Bridge 170 can also include various kinds of memory and storage devices 173. Memory devices can include volatile and non-volatile memory (e.g., random access memory (RAM), dynamic RAM (DRAM), synchronous DRAM (SDRAM), static RAM (SRAM), etc.), and storage devices can include a hard disk drive (HDD), solid state drive (SSD), a HDD with a smaller amount of SSD storage to act as a SSD cache, a flash device, etc. The memory/storage devices 173 may serve to buffer data flowing between devices 110 and server 180. The memory devices 173 can also be used to store instructions provided by server 180, which are executed by microcontrollers 172, either at startup or periodically. The memory/storage devices 173 can also be used to store a bridge firmware for restoring the system. The storage devices can be used as secondary storage or for audit purposes, etc. Communication interfaces 174 allow the bridge 170 to communicate with server 180 over network 160. Communication interfaces 174 can include wired (e.g., Ethernet), or wireless (e.g., WiFi, cellular—3G, 4G, LTE, 5G, etc.) interfaces. Communication interfaces 174 may include other functionality, such as encryption functions, etc. Though not explicitly labelled in FIG. 4, the bridge 170 may include internal interconnects (e.g., on-chip networks or network on chip (NOC)) between the various components (e.g., protocol controllers 171, memory/storage devices 173, microprocessors 172, and communication interfaces 174) of the bridge 170 to communicatively couple the components to one another for an efficient communication. The data received from the devices 110 is transmitted to the server 180 (over network 160) via communication interfaces 174. Similarly, the data from server 180 is received by bridge 170 over network 160 and transmitted to the devices 110 via protocol controllers 171. The data may be formatted and aggregated (which may be optional in some embodiments) before transmission to the server 180. As described previously, the bridge 170 may store the data (between the server 180 and devices 110) in the memory/storage devices 173. Similarly, the data from server 180 may be un-formatted and segregated before being sent to the devices 110. The bridge 170 can aggregate data from multiple devices, e.g., devices 110-01, 110-02 (or a single device 110-01) before formatting the data and transmission to the server 180 over network 160. Similarly, the server 180 can send control instructions to multiple devices, e.g., devices 110-01, 110-02, etc. in an aggregated manner to control the devices. Upon receiving the information from the server 180, bridge 170 segregates the data for each device 110. The protocols used to communicate with devices 110-01 and 110-02 can be different or the same. This simultaneous control of multiple devices can lead huge savings and operation efficiency especially when controlling many hundreds of devices (e.g., lights in hotel floors, buildings, streetlights etc.). In addition to the simultaneous control, the system 300 can sequentially control the devices 110 in a controlled fashion. For instance, server 180 can instruct bridge 170 via network 160 to first control device 110-01, after 'x' amount of time (e.g., 5 seconds, 5 minutes, etc.) control the second device 110-02, and then after 'x' time control the third device 110-03, etc. The server 180 can achieve the sequential control of the devices using a single instruction or command to the bridge, thereby leading to operation efficiency. The instructions from server 180 can also be more complex, e.g., the server 180 may send an instruction or command to the bridge 170, where the bridge 170 is to send "data 1" to device 110-01 if "information 1" is received from device 110-02. Otherwise, bridge 170 is to send "data 2" to device 110-01 if "information 2" is received from device 110-02, etc.

As the devices 110 are connected or coupled to the bridge 170 using a low-level protocol (like Bluetooth, LoRA, Wi-Fi, etc.) and not to the network 160, the devices 110 are more secured. The enhanced security is achieved without loss of any functionality. Control and communication to devices is achieved only via the bridge 170. In some embodiments, bridge 170 does not allow for any local control and can only be controlled by the server 180. This prevents a local tampering of the bridge 170 and enhances the security of the system 300. As described above, communication interfaces 174 allow for communication to server 180 over network 160. The communication interface 174 includes the required hardware and also software stacks (TCP/IP etc.) to enable communication to the server 180. As the bridge 170 only communicates to the server 180, security within system 300 can be enhanced by adding encryption and authentication operations.

With continued reference to FIG. 4, bridge 170 can also include a battery 175 (which may be optional in some embodiments) to allow operation during power outages. This can be critical for certain devices 110, such as security monitoring devices, or for monitoring other mission critical devices, such as medical devices, etc. In addition, bridge 170 may include power supplies 176 that accept standard input voltage (e.g., 110V, 220V, etc.) and provide power to various components within the bridge 170. In an embodiment, bridge 170 can include power supply form factors 177 that conform to mechanical form factors required to connect to a local power supply. In some embodiments, the functionality of bridge 170 can be implemented using processors, discrete components (such as processors, DSP (digital signal processor) and memory), SoC (system-on-chip), field programmable gate arrays (FPGAs), ASICs (application specific integrated circuit), PCB (printed circuit board) or a combination thereof.

Figure 5:
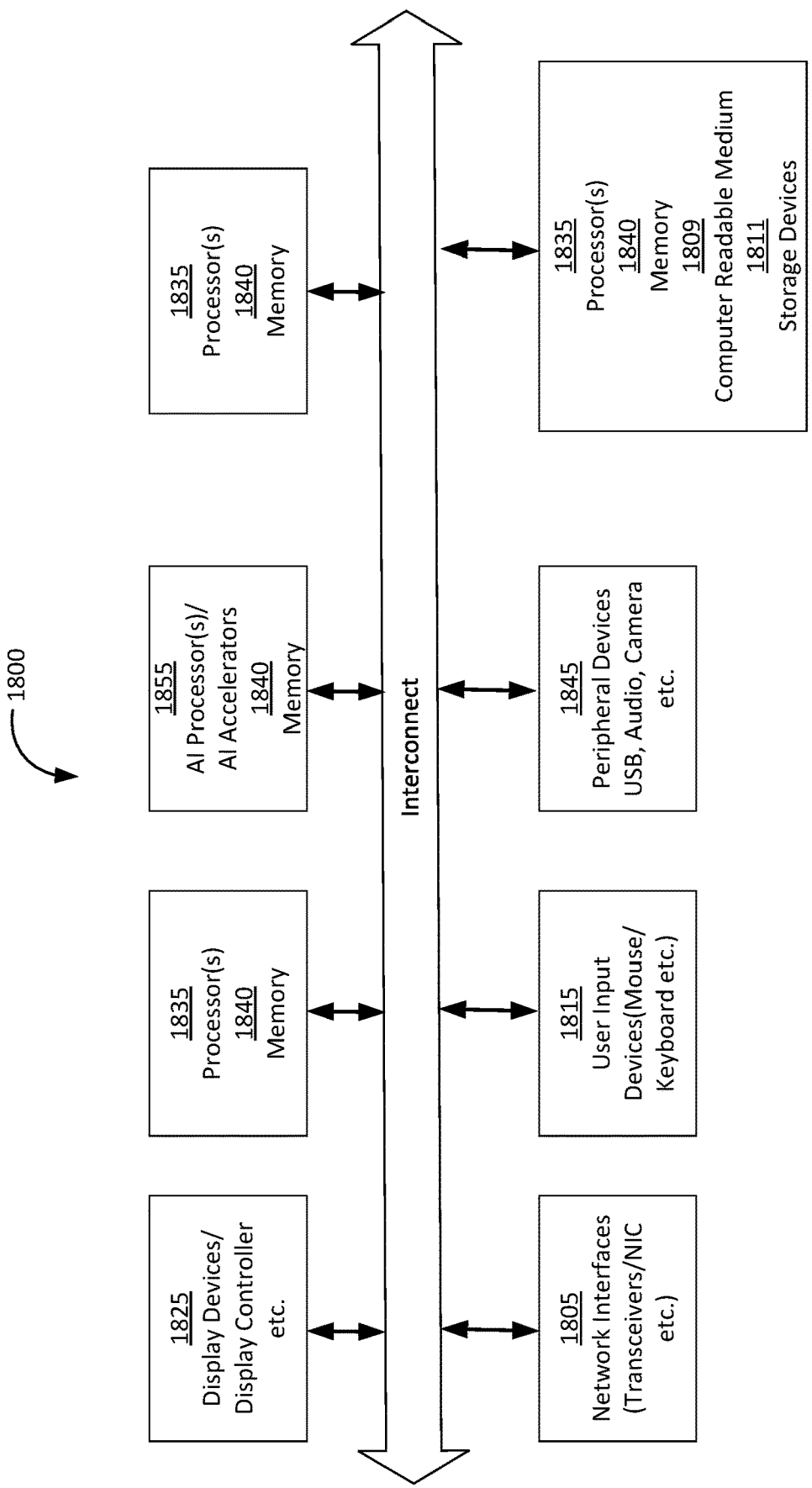
FIG. 5 is a block diagram illustrating an example of a server according to an embodiment.

FIG. 5 is a block diagram illustrating an example of a server according to an embodiment. In some embodiments, the server may be server 180 of FIGS. 3A-3B. As shown in FIG. 5, server 1800 can include one or more processors 1835, memories 1840, one or more AI (artificial intelligence) processors 1855, AI accelerators, network interfaces 1805, user input devices 1815, and peripheral devices 1845. Memories 1840 can include volatile and non-volatile memories. Network interfaces 1805 may include transceivers, NIC (network interface card), etc. Storage devices 1811 may include HDD, SSD or other media, such as CD/tape drives, etc. User input devices 1815 can include peripherals, such as mice, keyboards, etc., or other peripheral devices, such as USB (universal serial bus) connector, an audio device, a computer, etc. Server 180 can include display device or controller 1825. While FIG. 5 illustrates a generic server, the server can be implemented as a cloud server, an edge server, a distributed server or a combination thereof. AI processor/AI accelerators 1855 allow server 1800 to learn autonomously for a better user experience.

The processes or methods described may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A cloud-based control system for controlling a plurality of Internet of Things (IoT) devices, the system comprising:
a cloud-based server; and
a plurality of bridges, each bridge coupled to its respective group of IoT devices from the plurality of IoT devices, operable in a plurality of communication protocols, and communicating with the respective group of IoT devices using at least one of the plurality of communication protocols;
wherein each bridge transmits data received from the respective group of IoT devices to the cloud-based server, and receives data from the cloud-based server to be transmitted to at least one IoT device from the respective group of IoT devices;
wherein the plurality of the bridges includes a first bridge coupled to a corresponding first set of IoT devices and a second bridge coupled to a corresponding second set of IoT devices;
wherein the cloud-based server is coupled to the first bridge and not to the second bridge, through a network, while the second bridge continues to be coupled to the corresponding second set of IoT devices to control the corresponding second set of IoT devices and the first bridge continues to be coupled to the corresponding first set of IoT devices to control the corresponding first set of IoT devices;
wherein the second bridge detects the first bridge as a device through which to communicate with the cloud-based server, and thereby:
receives particular data from the corresponding second set of IoT devices to send to the cloud-based server, based, at least in part, on the particular data, transmits second bridge data to the first bridge to receive the second bridge data to forward to the cloud-based server;
wherein the first bridge forwards the second bridge data that is based, at least in part, on the particular data received from the corresponding second set of IoT devices coupled to the second bridge, to the cloud-based server.

2. The system of claim 1, wherein the second bridge is in communication with the first bridge over the network or directly using a communication protocol from the plurality of communication protocols, so as to provide geographical expansion, connect to additional IoT devices, or use for redundancy.

3. The system of claim 1, wherein each bridge includes at least one protocol controller that controls the plurality of communication protocols to communicate with the respective group of IoT devices.

4. The system of claim 1, wherein each bridge segregates cloud data received from the cloud-based server for the at least one IoT device into segregated data, and then transmits the segregated data to the at least one IoT device using a communication protocol.

5. The system of claim 1, wherein each bridge aggregates IoT device data received from the respective group of IoT devices prior to transmitting the IoT device data from the respective group of IoT devices to the cloud-based server.

6. The system of claim 1, wherein cloud data received from the cloud-based server comprises one or more control instructions to sequentially control the at least one IoT device from the respective group of IoT devices.

7. The system of claim 6, wherein the one or more control instructions are aggregated to sequentially control the at least one IoT device from the respective group of IoT devices.

8. The system of claim 6, wherein the one or more control instructions comprise a first control instruction that controls a first IoT device, and a second control instruction that controls a second IoT device after a first amount of time.

9. The system of claim 1, wherein for each bridge,
the cloud-based server sends a first instruction to the bridge when the cloud-based server receives first information from a second IoT device from the respective group of IoT devices, wherein the first instruction instructs the bridge to send first data to a first IoT device from the respective group of IoT devices; or
the cloud-based server sends a second instruction to the bridge when the cloud-based server receives second information from the second IoT device, wherein the second instruction instructs the bridge to send second data to the first IoT device.

10. A computer-implemented method, comprising steps:
transmitting data received, by each bridge in a plurality of bridges from a respective group of IoT devices to a cloud-based server, wherein said each bridge is coupled to said respective group of IoT devices from a plurality of IoT devices, operable in a plurality of communication protocols, and communicating with said respective group of IoT devices using at least one of the plurality of communication protocols;
receiving, by said each bridge, data from the cloud-based server to be transmitted to at least one IoT device from the respective group of IoT devices;
wherein the plurality of the bridges includes a first bridge coupled to a corresponding first set of IoT devices and a second bridge coupled to a corresponding second set of IoT devices;
wherein the cloud-based server is coupled to the first bridge and not to the second bridge through a network, while the second bridge continues to be coupled to the corresponding second set of IoT devices to control the corresponding second set of IoT devices and the first bridge continues to be coupled to the corresponding first set of IoT devices to control the corresponding first set of IoT devices;
wherein the second bridge detects the first bridge as a device through which to communicate with the cloud-based server;
receiving, by the second bridge, particular data from the corresponding second set of IoT devices to send to the cloud-based server,
based, at least in part, on the particular data, transmitting, by the second bridge, second bridge data to the first bridge to receive the second bridge data to forward to the cloud-based server;
forwarding, by the first bridge, the second bridge data that is based, at least in part, on the particular data received from the corresponding second set of IoT devices coupled to the second bridge, to the cloud-based server;

wherein the steps are performed by one or more processors.

11. The method of claim 10, wherein the second bridge is in communication with the first bridge over the network or directly using a communication protocol from the plurality of communication protocols, so as to provide geographical expansion, connect to additional IoT devices, or use for redundancy.

12. The method of claim 10, wherein said each bridge includes at least one protocol controller that controls the plurality of communication protocols to communicate with the respective group of IoT devices.

13. The method of claim 10, further comprising:
segregating, by said each bridge, cloud data received from the cloud-based server for the at least one IoT device into segregated data;
transmitting, by said each bridge, the segregated data to the at least one IoT device using a communication protocol.

14. The method of claim 10, further comprising:
aggregating, by said each bridge, IoT device data received from the respective group of IoT devices prior to transmitting the IoT device data from the respective group of IoT devices to the cloud-based server.

15. The method of claim 10, wherein the cloud data received from the cloud-based server comprises one or more control instructions to sequentially control the at least one IoT device from the respective group of IoT devices.

16. The method of claim 15, wherein the one or more control instructions comprise a first control instruction that controls a first IoT device, and a second control instruction that controls a second IoT device after a first amount of time.

17. The method of claim 15, wherein the one or more control instructions are aggregated to sequentially control the at least one IoT device from the respective group of IoT devices.

18. The method of claim 10, wherein for said each bridge,
the cloud-based server sends a first instruction to the bridge when the cloud-based server receives first information from a second IoT device from the respective group of IoT devices, wherein the first instruction instructs the bridge to send first data to a first IoT device from the respective group of IoT devices; or
the cloud-based server sends a second instruction to the bridge when the cloud-based server receives second information from the second IoT device, wherein the second instruction instructs the bridge to send second data to the first IoT device.

* * * * *